Jan. 8, 1929.   J. L. RUBEL   1,697,966
SOLDERING STAND
Filed July 5, 1924
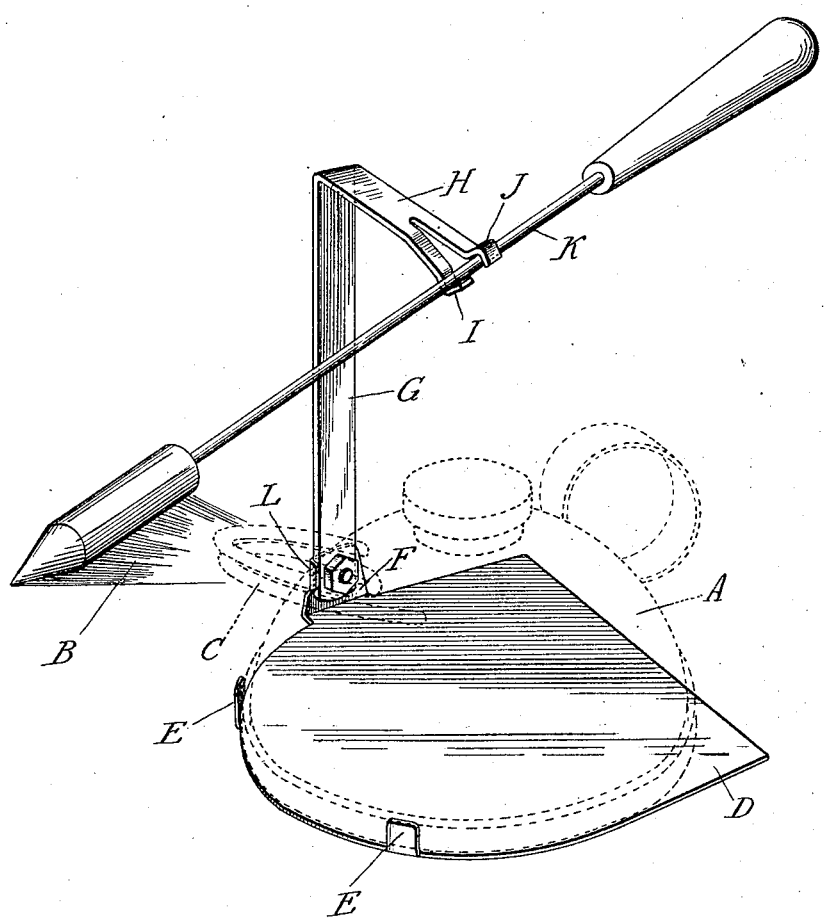

Patented Jan. 8, 1929.

1,697,966

UNITED STATES PATENT OFFICE.

JAMES L. RUBEL, OF CHICAGO, ILLINOIS, ASSIGNOR TO APEX STAMPING COMPANY, OF RIVERDALE, ILLINOIS, A CORPORATION OF ILLINOIS.

SOLDERING STAND.

Application filed July 5, 1924. Serial No. 724,203.

My invention relates to a stand which I have devised for the convenient reception and support of a blow torch soldering outfit including a small hand blow torch and soldering iron suitable for use in performing soldering operations. While the specific construction of the torch and soldering iron form no part of my present invention it will be understood that the torch is formed with a flat base, adapted to engage the base member of the stand, and the iron with the ordinary handle and a shaft arranged to engage the supporting arm of the stand. The object of my invention is to provide a stand for the two members mentioned which shall be convenient and desirable, and which shall exhibit various features of novelty and utility in the construction and arrangement of its parts, which will be apparent from the description hereinafter given and which contribute to the usefulness and efficiency of the outfit, the essential elements of my invention being more particularly pointed out in the appended claims.

In the drawing I have shown in perspective a stand embodying my invention and supporting a soldering iron, and have shown in dotted lines a blow torch such as the stand is designed to receive.

The torch A, as shown, is a small, self-blowing hand torch, preferably formed with a round, flat bottom and so constructed that the jet of flame B, which in the present instance issues between the turns of a vaporizing coil C, is directed in an inclined upward direction. The base D of the stand may conveniently be made of a sheet metal plate formed with a plurality of marginal positioning lugs E arranged to hold the torch in proper position thereon. At the rear side of the base a bracket lug F is struck up from the plate and to this bracket is pivoted an arm G, the axis of the pivot extending horizontally outward in line with the center of the base. In working position this arm stands vertically and it is formed with a horizontal cross portion H which at its end is split, and one branch (the one on the side next the flame) is formed with a terminal downwardly bowed bend I and the other branch is formed with a corresponding upwardly bowed bend J, the two branches being in the present instance bent to stand at different levels, so that the shaft K of the soldering iron may be inserted laterally between the bends and engage them at the right height and angle to position the head in the path of the jet of flame of the torch and subject it most effectively to the heating action of the flame. The weight of the head overbalances that of the handle and the separated stop surfaces provided by the bends, contacting with longitudinally separated points on the shaft of the iron, cause the iron to remain in any overbalanced position in which it may be placed. Obviously the iron may be adjusted longitudinally, within limits, or rotated, so that the flame may be caused to play upon the head of the iron exactly as desired.

The bracket lug F to which the supporting arm is pivoted is preferably formed with a small stop lug L on which may be termed its forward side to prevent excess movement and position the arm in vertical position, and to prevent any overbalanced movemnt of the arm under influence of the weight of the head of the iron in case the pivot joint, which is designedly constructed to provide stiff frictional engagement, should become loose. The pivotal mounting of the supporting arm enables the stand to be packed compactly with the torch and iron and desired supplies, and provides a further means for adjusting the iron with respect to the heating flame which is available if desired.

I claim:

1. A stand for supporting a soldering iron and a blow torch having an inclined laterally and upwardly directed flame jet, said stand comprising a base arranged to be engaged by the base of the torch and a vertical supporting arm formed with a top cross portion provided adjacent its end with upper and lower stop faces which are open laterally and arranged to contact severally with longitudinally separated points on the shaft of the iron and support the iron with its head in overbalanced position in the path of the flame jet.

2. A stand for supporting a soldering iron and a blow torch having an inclined laterally and upwardly directed flame jet, said stand comprising a base arranged to be engaged by the base of the torch and an arm pivoted on a horizontal axis and arranged to be swung from a horizontal position to vertical working position, said arm being formed with a top cross portion provided adjacent its end with upper and lower stop faces which are open laterally and arranged to contact severally with longitudinally separated points on the shaft of the iron and support the iron with its head in the path of the flame jet.

3. A stand for supporting a soldering iron and a blow torch having an inclined laterally and upwardly directed flame jet, said stand comprising a base arranged to be engaged by the base of the torch and an arm pivoted on a horizontal axis and arranged to be swung from a horizontal position to vertical working position, said arm being formed with a top cross portion provided adjacent its end with upper and lower stop faces which are open laterally and arranged to contact severally with longitudinally separated points on the shaft of the iron and support the iron with its head in overbalanced position in the path of the flame jet, and said base of the stand and arm being formed with cooperating stop surfaces arranged to prevent overbalanced movement of the arm under the weight of the head of the iron.

4. A supporting stand according to claim 1 in which the cross portion of the supporting arm is split and the two branches formed respectively with a terminal upwardly bowed bend and a terminal downwardly bowed bend forming the separated stop surfaces.

5. A stand comprising a base plate, an arm pivoted to said base adjacent its margin on a horizontal axis extending centrally of said base and arranged to be swung to vertical working position, said arm being formed with a top cross portion having adjacent its free end upper and lower stop faces which are spaced transversely of such cross portion and are laterally open.

6. The combination of a blow torch, a soldering iron, and a supporting stand having a base plate arranged to support said torch and having a vertical supporting arm adjacent the margin of said base plate formed with a top cross portion provided adjacent its free end with engaging means arranged to receive the shaft of the iron and support the iron in heating position.

JAMES L. RUBEL.